US012191599B2

(12) United States Patent
Crane

(10) Patent No.: US 12,191,599 B2
(45) Date of Patent: Jan. 7, 2025

(54) HIGH CURRENT TERMINAL ASSEMBLY

(71) Applicant: Oetiker NY, Inc., Lancaster, NY (US)

(72) Inventor: Andrew Jon Crane, Lockport, NY (US)

(73) Assignee: Oetiker NY, Inc., Lancaster, NY (US)

( * ) Notice: Subject to any disclaimer, the term of this patent is extended or adjusted under 35 U.S.C. 154(b) by 508 days.

(21) Appl. No.: 17/635,232

(22) PCT Filed: May 28, 2020

(86) PCT No.: PCT/US2020/034774

§ 371 (c)(1),
(2) Date: Feb. 14, 2022

(87) PCT Pub. No.: WO2021/055024

PCT Pub. Date: Mar. 25, 2021

(65) Prior Publication Data

US 2022/0224043 A1 Jul. 14, 2022

Related U.S. Application Data

(60) Provisional application No. 62/901,580, filed on Sep. 17, 2019.

(51) Int. Cl.

| | |
|---|---|
| ***H01R 13/53*** | (2006.01) |
| ***H01R 13/42*** | (2006.01) |
| ***H01R 13/52*** | (2006.01) |
| ***H01R 13/74*** | (2006.01) |

(52) U.S. Cl.

CPC ............. *H01R 13/53* (2013.01); *H01R 13/42* (2013.01); *H01R 13/521* (2013.01); *H01R 13/748* (2013.01); *H01R 2201/26* (2013.01)

(58) Field of Classification Search

CPC ...... H01R 13/53; H01R 13/42; H01R 13/521; H01R 13/748; H01R 2201/26; H01R 13/4223

See application file for complete search history.

(56) References Cited

U.S. PATENT DOCUMENTS

| | | | |
|---|---|---|---|
| 7,347,745 | B1 | 3/2008 | Raudenbush et al. |
| 7,494,362 | B2 | 2/2009 | Dieterle et al. |
| 7,530,843 | B1 | 5/2009 | Tesfay et al. |
| 8,052,427 | B2 | 11/2011 | Doo et al. |
| 9,085,240 | B2 | 7/2015 | Rathmacher |

(Continued)

FOREIGN PATENT DOCUMENTS

| | | |
|---|---|---|
| CN | 100416934 C | 9/2008 |
| CN | 104638221 A | 5/2015 |

(Continued)

*Primary Examiner* — Michael C Zarroli

(74) *Attorney, Agent, or Firm* — Harter Secrest & Emery LLP; Michael Nicholas Vranjes

(57) ABSTRACT

A high current terminal assembly, including a terminal including a first end, a second end, and a radially outward facing surface, and a shroud at least partially surrounding the terminal, the shroud including a third end arranged proximate to the first end, a fourth end forming a first flange, and a first hole forming a radially inward facing surface, wherein the terminal is arranged in the first hole and the radially inward facing surface is operatively arranged to engage the radially outward facing surface.

18 Claims, 8 Drawing Sheets

(56) References Cited

U.S. PATENT DOCUMENTS

| | | | | |
|---|---|---|---|---|
| 9,161,482 | B2 | 10/2015 | Adachi et al. | |
| 9,228,605 | B2 * | 1/2016 | Takemura | H01R 4/301 |
| 9,270,060 | B2 | 2/2016 | Adachi et al. | |
| 9,337,567 | B2 | 5/2016 | Rangi et al. | |
| 9,553,397 | B2 | 1/2017 | Eom et al. | |
| 9,997,974 | B2 * | 6/2018 | Ishibashi | H02K 5/225 |
| 10,062,974 | B2 * | 8/2018 | Okamoto | H01R 4/34 |
| 10,211,564 | B2 | 2/2019 | Miyazawa et al. | |
| 2013/0045622 | A1 | 2/2013 | O'Sullivan et al. | |
| 2013/0095704 | A1 | 4/2013 | Awakura et al. | |
| 2016/0111809 | A1 | 4/2016 | Kataoka et al. | |
| 2017/0149166 | A1 | 5/2017 | Mann et al. | |
| 2018/0219319 | A1 * | 8/2018 | Kropiewnicki | H01R 13/53 |
| 2020/0059035 | A1 * | 2/2020 | Denzinger | H01R 13/521 |

FOREIGN PATENT DOCUMENTS

| | | | |
|---|---|---|---|
| CN | 205356038 | U | 6/2016 |
| CN | 205609656 | U | 9/2016 |
| EP | 1816711 | A1 | 8/2007 |
| EP | 3402010 | A1 | 11/2018 |
| GB | 2308753 | A | 2/1997 |
| JP | 2007207760 | | 8/2007 |
| JP | 2011108633 | | 6/2011 |
| JP | 5606581 | | 10/2014 |
| KR | 101262815 | B1 | 5/2013 |
| KR | 20150136842 | A | 12/2015 |

* cited by examiner

HIGH CURRENT TERMINAL ASSEMBLY

CROSS-REFERENCE TO RELATED APPLICATIONS

The present application is a U.S. National Stage Application pursuant to 35 U.S.C. § 371 of International Patent Application No. PCT/US2020/034774, filed on May 28, 2020, which application claims the benefit U.S. Provisional Patent Application No. 62/901,580, filed on Sep. 17, 2019, which applications are hereby incorporated by reference in their entireties.

FIELD

The present disclosure relates to electrical connectors, and more particularly, to high current terminals for use in electric vehicles and other high current environments.

BACKGROUND

A terminal is the point at which a conductor from a component, device, or network comes to an end. Terminal may also refer to an electrical connector at this endpoint, acting as the reusable interface to a conductor and creating a point where external circuits can be connected. A terminal may simply be the end of a wire or it may be fitted with a connector or fastener.

As the electric vehicles industry grows, so does the demand for high current terminal technology. Generally, electric vehicles are powered by a direct current (DC) battery, which is used to power a motor. Electric cars use an inverter to convert the DC power from the battery to alternating current (AC) power. The inverter can change the speed at which the motor rotates by adjusting the frequency of the alternating current. Thus, a power inverter is a key component in electric vehicles. Additionally, since electric vehicles use high current circuitry, damage to the terminals can be extremely dangerous. If, for example, a scratch, gouge, dent, etc. exists in the nickel plated finish of a high current terminal of the inverter, an arc can occur at the location of that imperfection leading to a burned out connection or even a fire. Therefore, protecting the integrity of the plated finish of high current terminals is essential, especially during manufacturing and assembly of electric vehicles when damage to the finish is likely to occur.

Thus, there has been a long-felt need for a high current terminal assembly that has improved durability and safety.

SUMMARY

According to aspects illustrated herein, there is provided a high current terminal assembly, comprising a terminal including a first end, a second end, and a radially outward facing surface, and a shroud at least partially surrounding the terminal, the shroud including a third end arranged proximate to the first end, a fourth end forming a first flange, and a first hole forming a radially inward facing surface, wherein the terminal is arranged in the first hole and the radially inward facing surface is operatively arranged to engage the radially outward facing surface.

In some embodiments, the radially outward facing surface comprises a first groove proximate the first end, the radially inward facing surface comprises a protrusion proximate the third end and extending radially inward in a first radial direction therefrom, and the protrusion is operatively arranged to engage the first groove to connect the shroud to the terminal. In some embodiments, the engagement of the protrusion with the first groove prevents axial displacement of the shroud with respect to the terminal in a first axial direction. In some embodiments, the protrusion forms a frusto-conical surface extending in the first radial direction (i.e., radially inward) in a first axial direction. In some embodiments, the radially outward facing surface further comprises a second groove and a first seal is arranged in the second groove and operatively arranged to engage the radially inward facing surface to fluidly seal the terminal and the shroud. In some embodiments, the first flange comprises a second hole. In some embodiments, the high current terminal assembly further comprises a bushing arranged in the second hole, wherein the bushing comprises a first material having a first hardness, the shroud comprises a second material having a second hardness, and the first hardness is greater than the second hardness. In some embodiments, the terminal further comprises a radial surface that traverses the radially outward facing surface. In some embodiments, the shroud further comprises a second flange extending radially inward in a first radial direction from the radially inward facing surface, the second flange operatively arranged to engage the radial surface. In some embodiments, the terminal further comprises an axial surface, the axial surface operatively arranged to engage the second flange to prevent displacement of the shroud with respect to the terminal in a second axial direction, opposite the first axial direction. In some embodiments, the radially outward facing surface further comprises a groove, and a seal is arranged in the groove and operatively arranged to engage a hole of an inverter housing to fluidly seal the shroud and the inverter housing. In some embodiments, the terminal further comprises a second hole arranged proximate the first end, and a third hole arranged proximate the second end.

According to aspects illustrated herein, there is provided a high current terminal assembly, comprising a shroud, comprising a first end, a second end forming a first flange, a first hole extending at least partially from the first end to the second end, the first hole forming a radially inward facing surface, and a second flange arranged between the first end and the second end, the second flange extending radially inward in a first radial direction from the radially inward facing surface.

In some embodiments, the shroud further comprises a protrusion arranged proximate the first end, the protrusion extending from the radially inward facing surface in the first radial direction. In some embodiments, the shroud further comprises a portion extending radially from the first flange, the portion including a second hole. In some embodiments, the radially inward facing surface forms a partial circle ending at a first axial surface. In some embodiments, the high current terminal assembly further comprises a terminal operatively arranged to engage the first hole, the terminal comprising a third end having a groove, the groove operatively arranged to engage the protrusion to prevent displacement of the terminal with respect to the shroud in a first axial direction, a fourth end, a radially outward facing surface operatively arranged at least proximate to the radially inward facing surface, and a second axial surface operatively arranged to engage second flange to prevent displacement of the terminal with respect to the shroud in a second axial direction, opposite the first axial direction.

According to aspects illustrated herein, there is provided a high current terminal assembly, comprising a terminal, comprising a first end including a groove, a second end, a radially outward facing surface, a radial surface that traverses the radially outward facing surface, and an axial surface arranged between the first end and the second end, the axial surface being arranged perpendicular to the radial surface.

In some embodiments, the terminal further comprises a first hole arranged proximate the first end, the first hole extending in a radial direction, and a second hole extending axially from the second end. In some embodiments, the high current terminal assembly further comprises a shroud operatively arranged to at least partially surround the terminal, the shroud comprising a third end, a fourth end forming a first flange, a first hole forming a radially inward facing surface, the terminal arranged in the first hole, a second flange arranged between the first end and the second end, the second flange extending radially inward from the radially inward facing surface and operatively arranged to engage the axial surface to prevent displacement of the terminal with respect to the shroud in a first axial direction, and a protrusion extending radially inward from the radially inward facing surface and operatively arranged to engage the groove to prevent displacement of the terminal with respect to the shroud in a second axial direction, opposite the first axial direction.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, and/or pneumatics.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

By "non-rotatably connected" elements, we mean that: the elements are connected so that whenever one of the elements rotate, all the elements rotate; and relative rotation between the elements is not possible. Radial and/or axial movement of non-rotatably connected elements with respect to each other is possible, but not required.

Figure 1A:
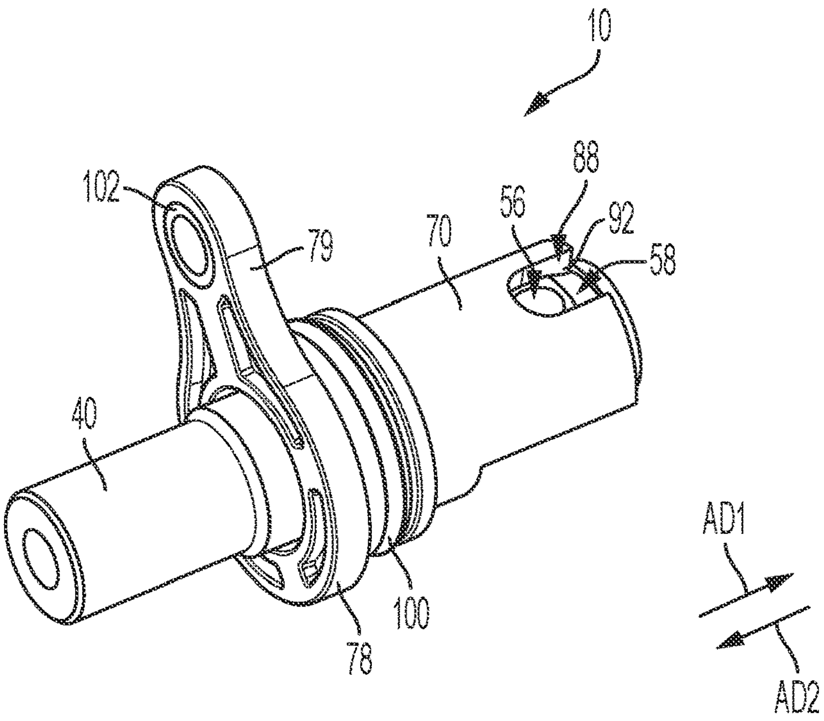
FIG. 1A is a front perspective view of a high current terminal assembly.
Figure 1B:
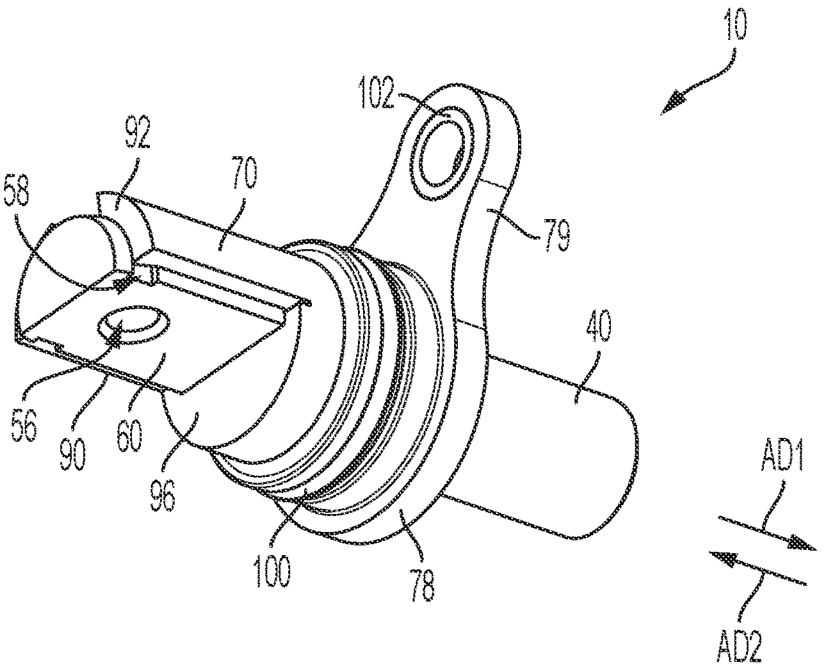
FIG. 1B is a rear perspective view of the high current terminal assembly shown in FIG. 1A.
Figure 2A:
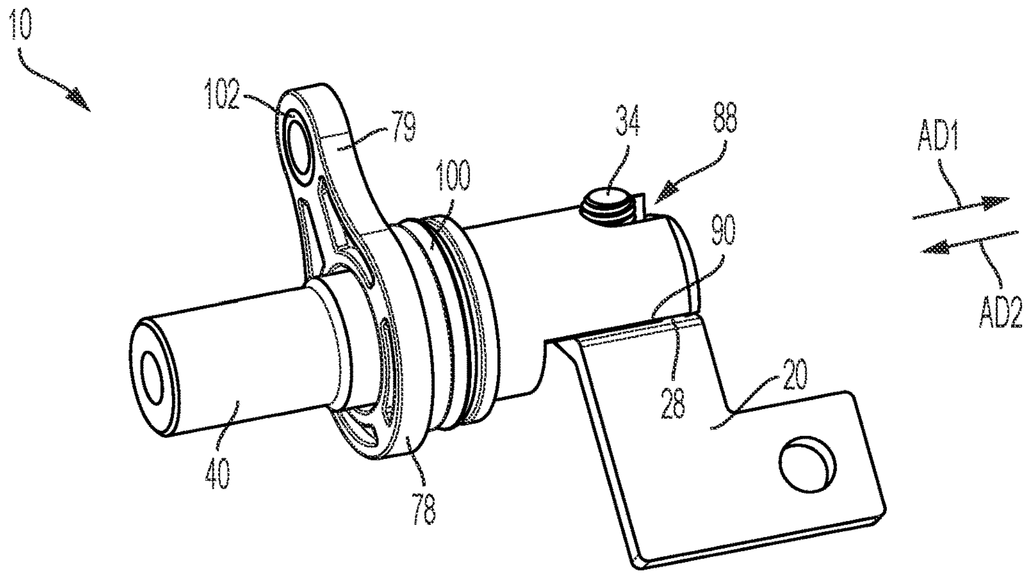
FIG. 2A is a front perspective view of the high current terminal assembly shown in FIG. 1A connected to a busbar.
Figure 2B:
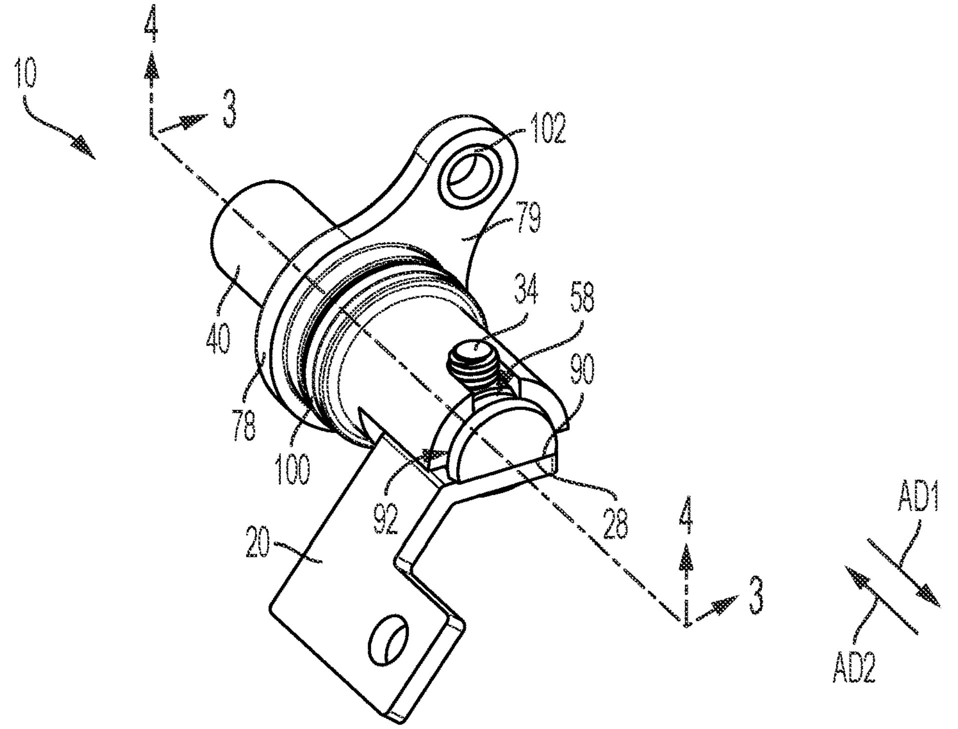
FIG. 2B is a rear perspective view of the high current terminal assembly shown in FIG. 2A connected to the busbar.
Figure 3:
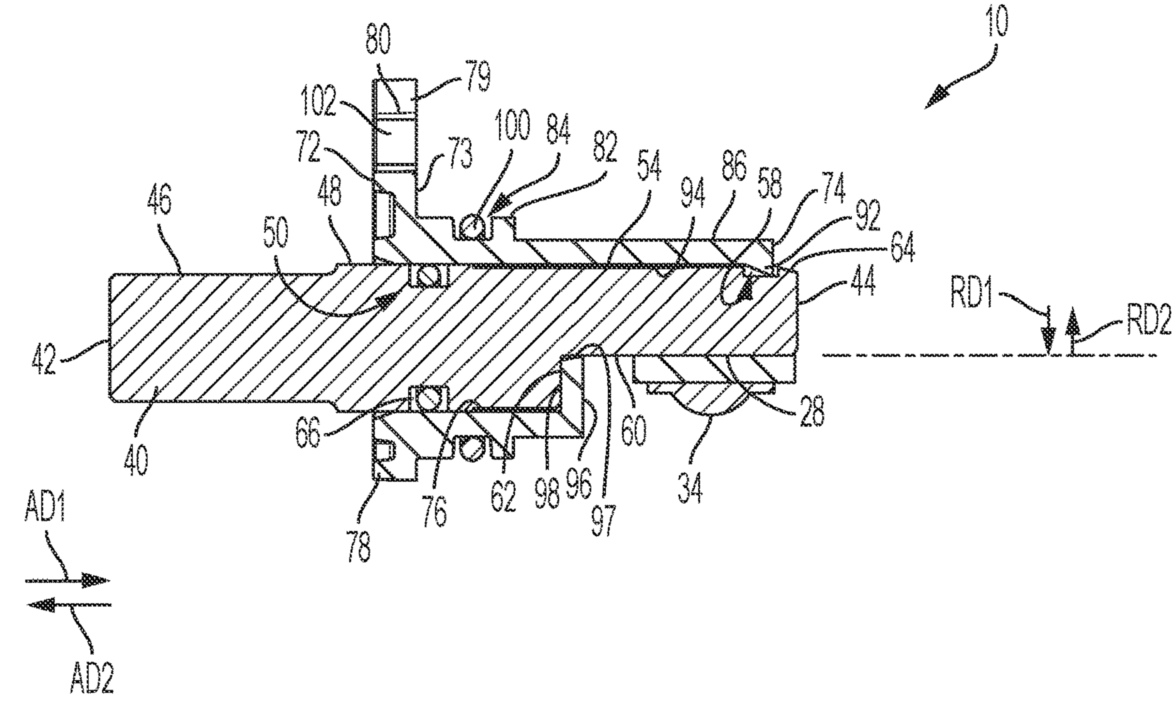
FIG. 3 is a cross-sectional view of the high current terminal assembly connected to the busbar taken generally along line 3-3 in FIG. 2B.
Figure 4:
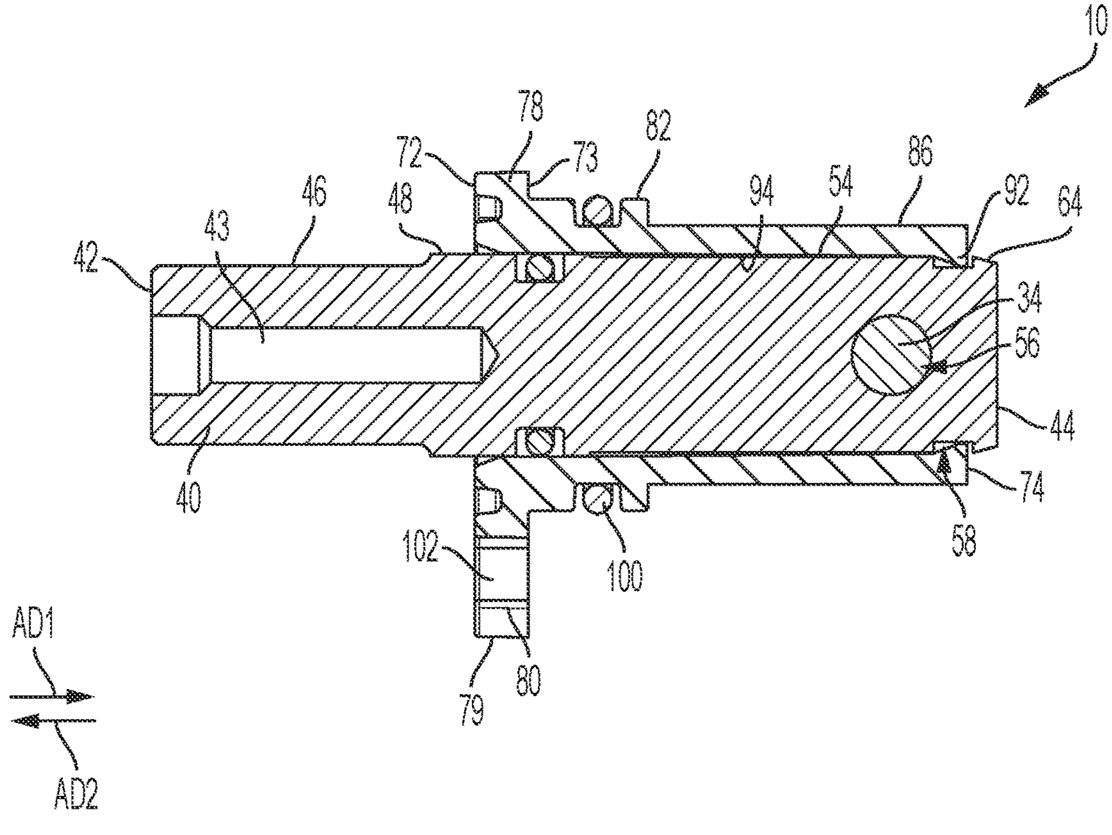
FIG. 4 is a cross-sectional view of the high current terminal assembly connected to the busbar taken generally along line 4-4 in FIG. 2B.
Figure 5:
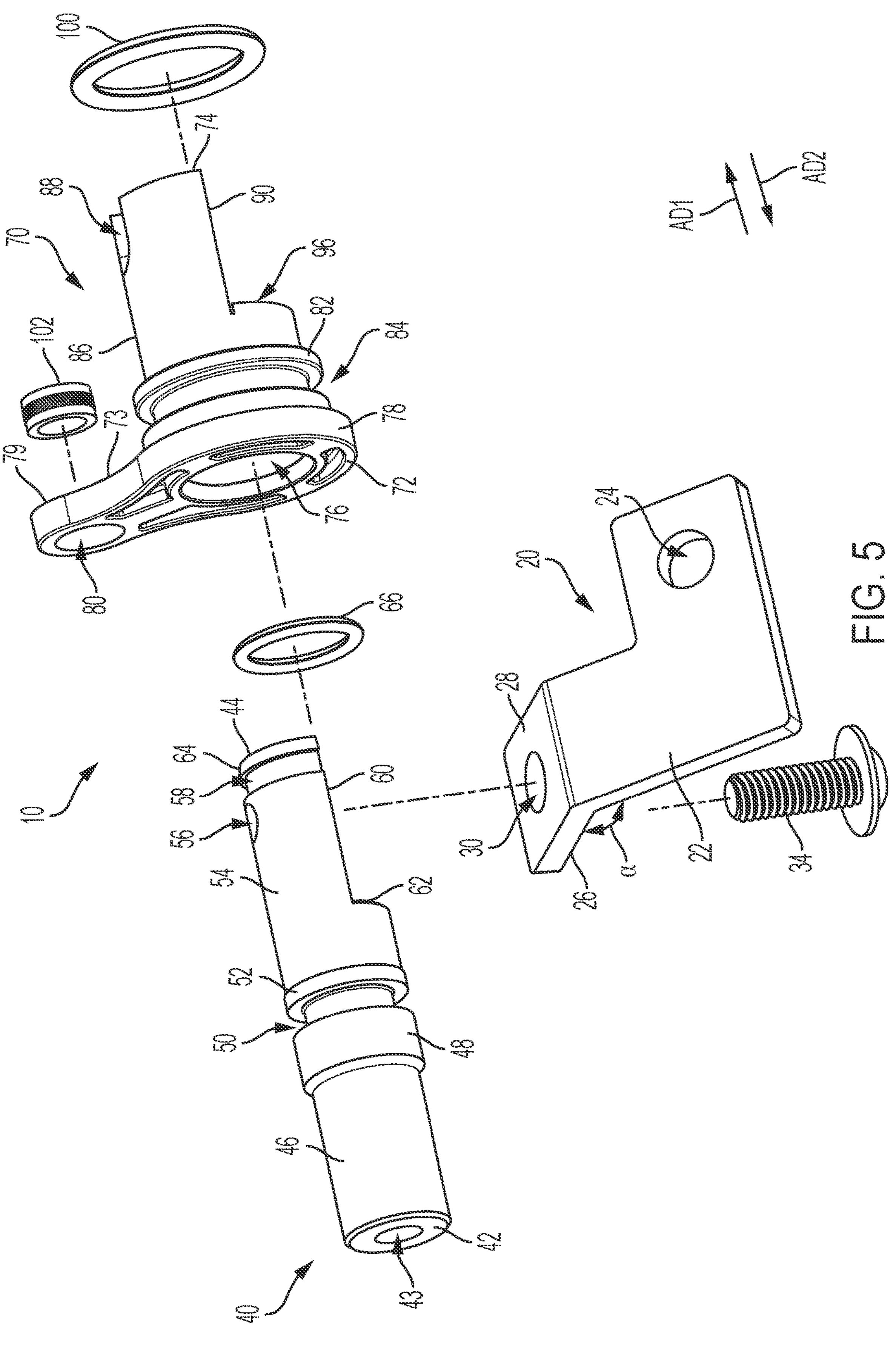
FIG. 5 is an exploded perspective view of the high current terminal assembly and the busbar shown in FIG. 2A.

Adverting now to the figures, FIG. 1A is a front perspective view of high current terminal assembly 10. FIG. 1B is a rear perspective view of high current terminal assembly 10. FIG. 2A is a front perspective view of high current terminal assembly 10 connected to busbar 20. FIG. 2B is a rear perspective view of high current terminal assembly 10 connected to busbar 20. FIG. 3 is a cross-sectional view of high current terminal assembly 10 connected to busbar 20 taken generally along line 3-3 in FIG. 2B. FIG. 4 is a cross-sectional view of high current terminal assembly 10 connected to busbar 20 taken generally along line 4-4 in FIG. 2B. FIG. 5 is an exploded perspective view of high current terminal assembly 10 and busbar 20. High current terminal assembly 10 generally comprises terminal 40 and shroud or cover 70. High current terminal assembly 10 is operatively arranged to be secured to an inverter housing (see FIGS. 8A-B). Specifically, terminal 40 is connected to shroud 70. Shroud 70 is arranged to be connected to the inverter housing, specifically the inside surface of the inverter housing, with end 74 extending out of an aperture therein. Busbar 20 is connected to terminal 40 on the exterior of the inverter housing, as will be described in greater detail below with respect to FIGS. 8A-B. The following description should be read in view of FIG. 1A-5.

Busbar 20 generally comprises section 22, and section 26. Section 26 comprises surface 28 and hole 30. Section 22 comprises hole 24. Busbar 20 is operatively arranged to be connected to terminal 40. Specifically, section 26 is arranged to be connected to end 44 of terminal 40 such that surface 28 abuts against surface 60 of terminal 40. In some embodiments, bolt or fastener 34 secures busbar 20 to terminal 40. For example, bolt 34 extends through hole 30 and is threadably engaged with hole 56 of terminal 40. It should be appreciated that any means for electrically connecting busbar 20 to terminal 40 may be used, for example, screws, rivets, welding, soldering, adhesives, clamps, retaining rings, etc. Busbar 20 is arranged to connect terminal 40 to an external component such as, for example, a motor in an electric vehicle. In some embodiments, and as shown, section 22 is arranged at angle α with respect to section 26. In some embodiments, angle α is greater than or equal to 0 degrees. In some embodiments, section 22 is substantially perpendicular to section 26 (i.e., angle α is 90 degrees). It should be appreciated that while holes 30 and 24 are illustrated as being circular, in some embodiments, hole 30 and/or hole 24 may be any geometry suitable for electrically connecting components, for example, square, rectangular, ovular, triangular, trapezoidal, etc. In some embodiments, bolt 34 connects busbar 20 to terminal 40 using a nut (i.e., in such embodiments hole 56 of terminal 40 may not be threaded).

Figure 6A:
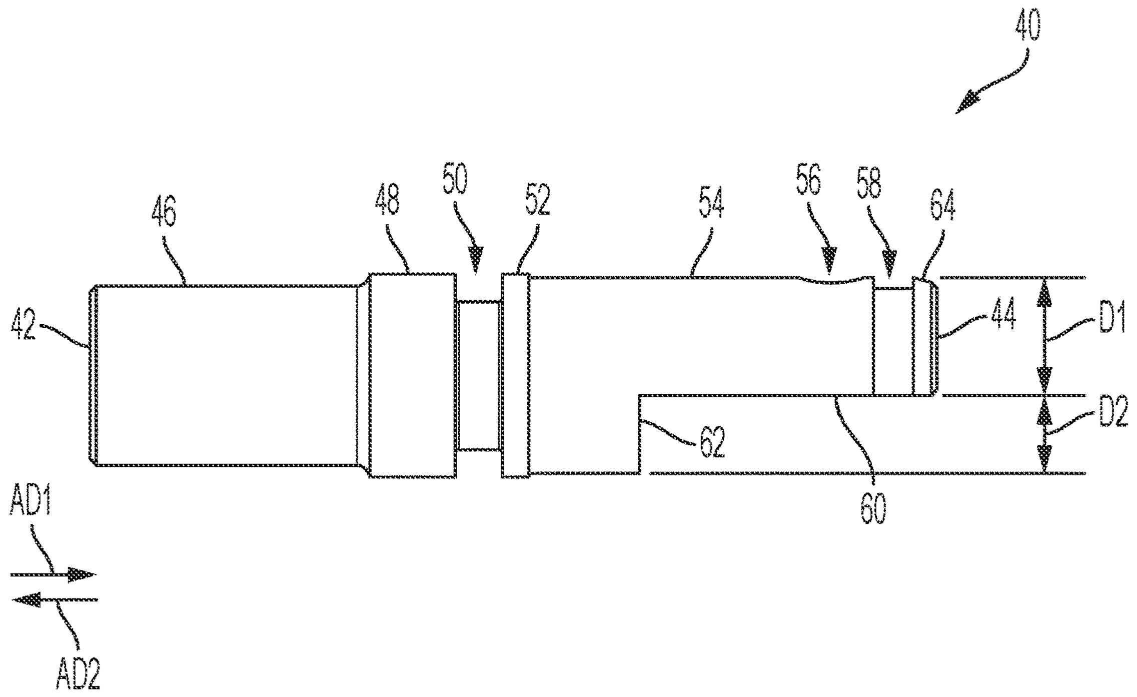
FIG. 6A is a side elevational view of the terminal shown in FIG. 1A.
Figure 6B:
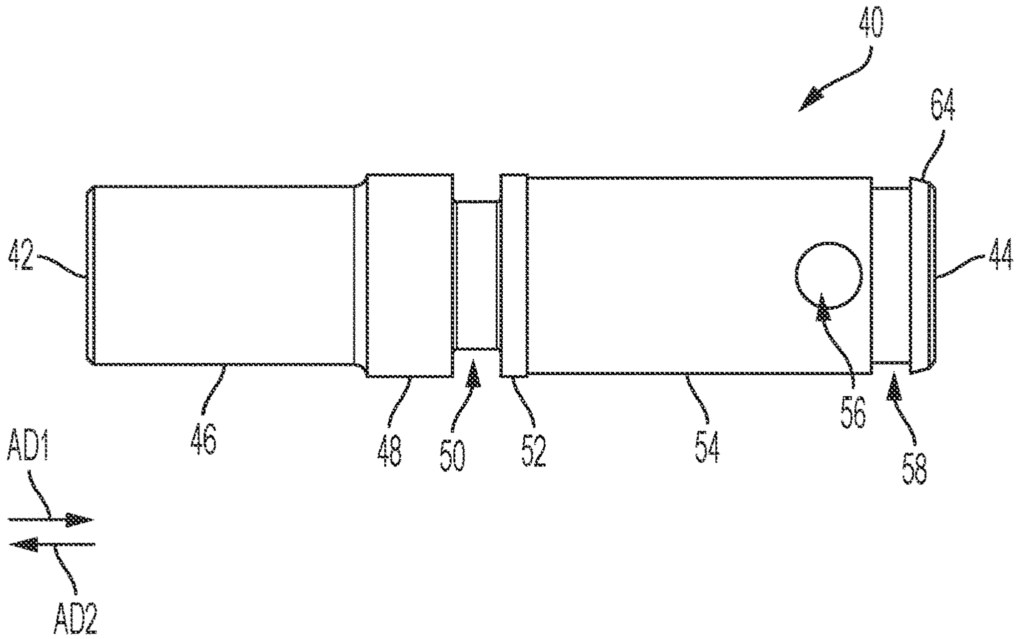
FIG. 6B is a top elevational view of the terminal shown in FIG. 1A.

FIG. 6A is a side elevational view of terminal 40. FIG. 6B is a top elevational view of terminal 40. The following description should be read in view of FIGS. 1A-6B and 8A-8B.

Terminal 40 generally comprises end 42, end 44, radially outward facing surface 46, radially outward facing surface 48, radially outward facing surface 52, radially outward facing surface 54, radially outward facing surface 64, surface 60, and surface 62. End 42 comprises hole 43 extending in axial direction AD1 therefrom. In some embodiments, end 42 is operatively arranged to be connected to a power module of an inverter, for example, via a busbar 110. In such embodiments, bolt 114 is fed through hole 112 of busbar 110 and threadably engaged with hole 43. In some embodiments, hole 43 comprises a counterbore. In some embodiments, hole 43 comprises a countersink. In some embodiments, hole 43 is threaded. Radially outward facing surface 46 is connected to end 42. Radially outward facing surface 48 is connected to radially outward facing surface 46. In some embodiments, radially outward facing surface 48 comprises a diameter that is larger than the diameter of radially outward facing surface 46; thus, radially outward facing surface 48 is arranged radially outward from radially outward facing surface 46 (i.e., stepped radially outward). In some embodiments, radially outward facing surface 46 and radially outward facing surface 48 are one continuous constant diameter surface. Radially outward facing surface 52 is separated from radially outward facing surface 48 by annular groove 50. Seal 66 is operatively arranged to be positioned in groove 50 such that it engages shroud 70, specifically radially inward facing surface 94 of shroud 70 thereby providing a seal between terminal 40 and shroud 70 (see FIGS. 3-4). Radially outward facing surface 54 is connected to radially outward facing surface 52. In some embodiments, radially outward facing surface 54 comprises a diameter that is less than the diameter of radially outward facing surface 52; thus, radially outward facing surface 52 is arranged radially outward from radially outward facing surface 54 (i.e., stepped radially outward). In some embodiments, radially outward facing surface 52 and radially outward facing surface 54 are one continuous constant diameter surface. Surface 60 is connected to radially outward facing surface 54 and extends in axial direction AD2 from end 44 to surface 62. Surface 60 is a radial surface which faces radial direction RD1 and traverses radially outward facing surface 54 (i.e., travels across or passes through radially outward facing surface 54). Put another way, surface 60 forms a secant as it intersects radially outward facing surface 54 at two points. As is known in the art, a secant is a line that intersects a circle in exactly two point. Here, surface 60 is a plane that intersects radially outward facing surface 54 at two points. In some embodiments, surface 60 is a midline that divides radially outward facing surface 54 in half such that distance D1 is equal to distance D2 (see FIG. 6A). In some embodiments, distance D1 is greater than distance D2. In some embodiments, distance D1 is less than distance D2. Surface 60 is operatively arranged to connect to and/or abut against surface 28 of busbar 20. Hole 56 is a through-bore that extends from surface 60 to radially outward facing surface 54. In some embodiments, hole 56 is threaded and is arranged to engage with bolt 34 to secure busbar 20 to terminal 40. In some embodiments, and as shown, hole 56 is centered on radially outward facing surface 54 (see FIG. 6B). In some embodiments, hole 56 is not centered on radially outward facing surface 54. Surface 62 is arranged parallel to end 44. In some embodiments, surface 62 is non-parallel to end 44. Surface 62 is operatively arranged to engage and/or abut against surface 98 of shroud 70. Radially outward facing surface 54 comprises annular groove 58 arranged proximate end 44. In some embodiments, groove 58 is arranged axially between hole 56 and radially outward facing surface 64. Groove 58 is operatively arranged to engage protrusion 92. Radially outward facing surface 64 is generally a frusto-conical surface that is connected to groove 58 and end 44. End 44 protrudes from hole 126 of inverter housing 120 such that busbar 20 can be secured to surface 60 of terminal 40 (see FIGS. 8A-8B), thereby connecting terminal 40 to an external component such as a motor.

Figure 7A:
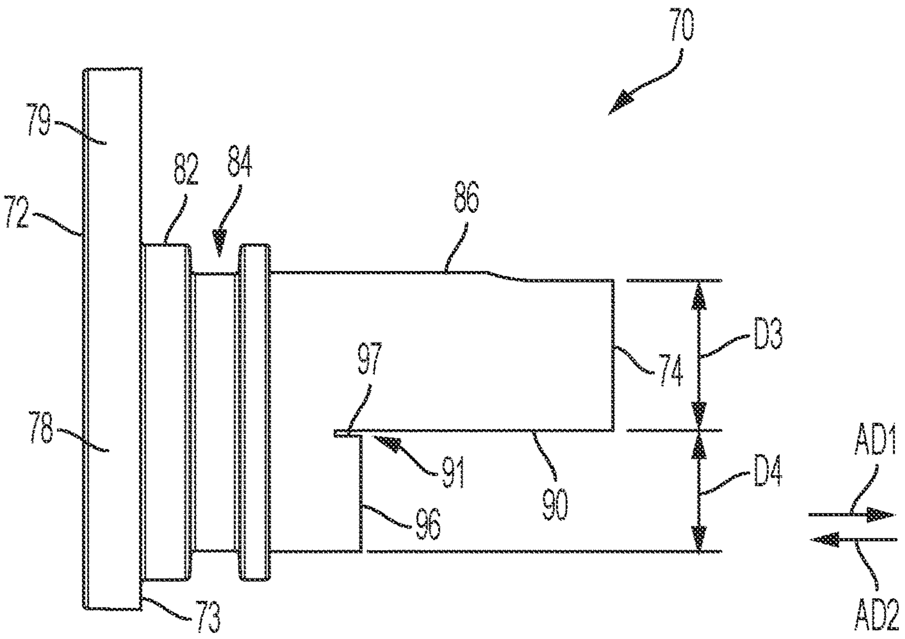
FIG. 7A is a side elevational view of the shroud shown in FIG. 1A.
Figure 7B:
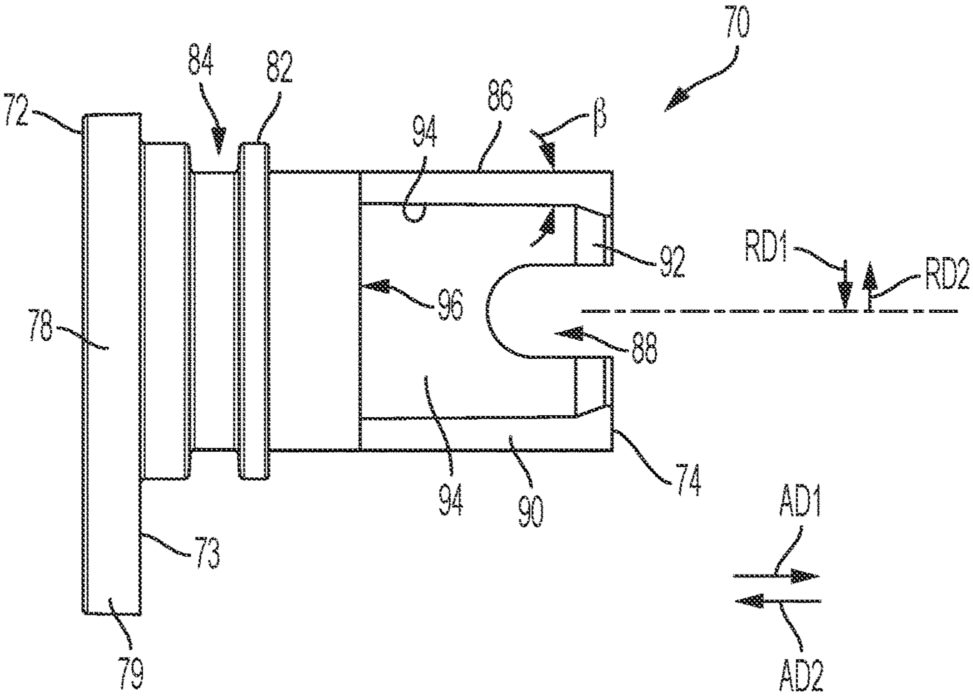
FIG. 7B is a bottom elevational view of the shroud shown in FIG. 1A.
Figure 7C:
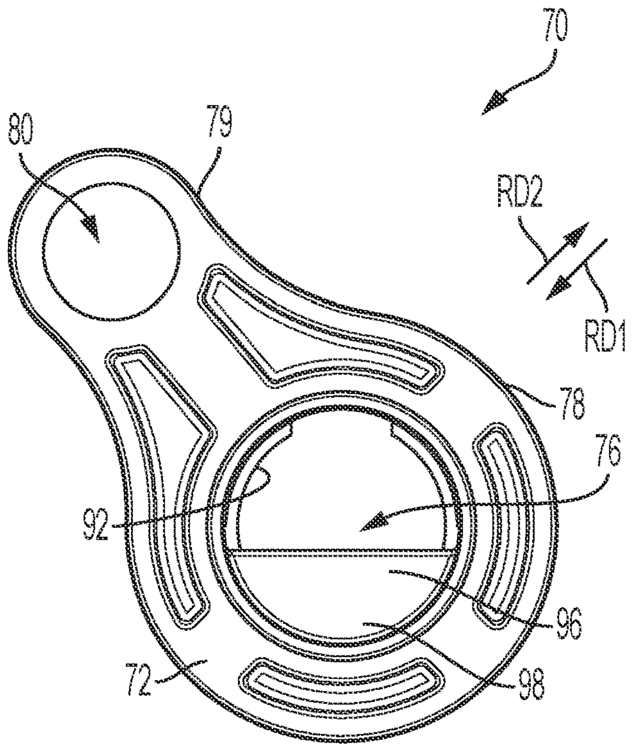
FIG. 7C is a front elevational view of the shroud shown in FIG. 1A.
Figure 7D:
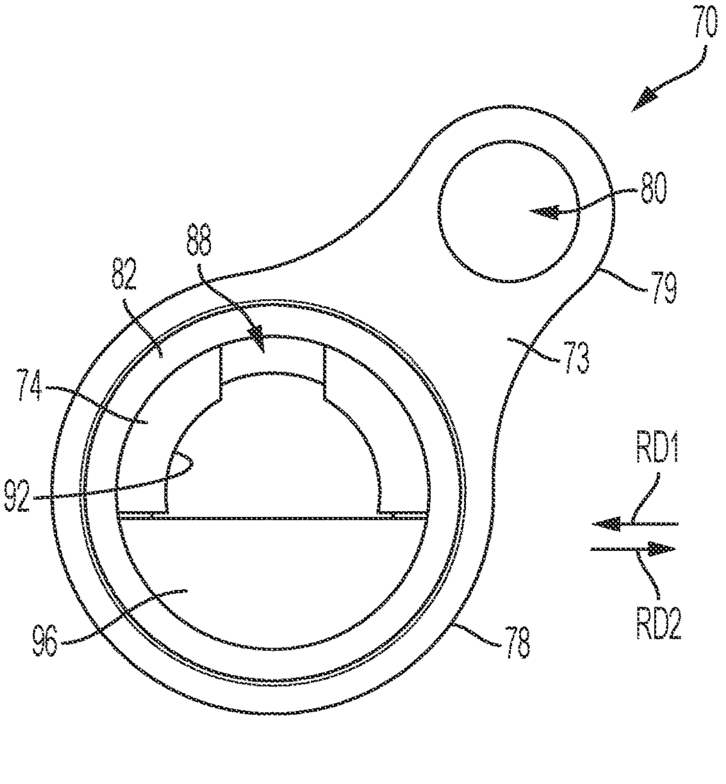
FIG. 7D is a rear elevational view of the shroud shown in FIG. 1A.

FIG. 7A is a side elevational view of shroud 70. FIG. 7B is a bottom elevational view of shroud 70. FIG. 7C is a front elevational view of shroud 70. FIG. 7D is a rear elevational view of shroud 70. The following description should be read in view of FIGS. 1A-8B.

Shroud 70 generally comprises end 72, end 74, flange 78 having portion 79 extending radially therefrom, radially outward facing surface 82, radially outward facing surface 86, surface 90, and flange 96. End 72 comprises hole 76 extending therefrom in axial direction AD1. Flange 78 forms end 72 and includes surface 73, which is operatively arranged to engage and/or abut against inner surface 122 of inverter housing (see FIG. 8B). Portion 79 extends radially from flange 78 and comprises hole 80. Hole 80 is arranged to be aligned with one of holes 128 in inverter housing 120 such that shroud 70 may be secured to inverter housing 120 via bolt 104 (see FIG. 8B). In some embodiments, bolt 104 extends through hole 80 and is threadably engaged with hole 128 of inverter housing 120 (see FIG. 8B). In some embodiments, the centerline of hole 80 is parallel to the center line of hole 76. In some embodiments, the centerline of hole 80 is non-parallel to the center line of hole 76. Shroud 70 may further comprise bushing or compression limiter 102. Bushing 102 is arranged in hole 80 by any suitable means, for example, adhesives, friction fit, press fit, etc. Bushing 102 is operatively arranged to prevent overtightening of bolt 104 such that portion 79 is damaged. For example, in some embodiments, inverter housing 120 comprises a metal, bolt 104 comprises a metal, and shroud 70 comprises a polymer or other insulative material. Overtightening bolt 104 could result in plastic deformation of portion 79 and thus an unsecure connection of shroud 70 to inverter housing. Thus, the inclusion of a metal bushing 102 prevents any such plastic deformation or damage to shroud 70. Radially outward facing surface 82 is connected to flange 78. In some embodiments, radially outward facing surface 82 comprises a diameter that is less than the diameter of the radially outward facing surface of the flange; thus, radially outward facing surface 82 is arranged radially inward from the radially outward facing surface of flange 78 (i.e., stepped radially inward). In some embodiments, radially outward facing surface 82 comprises annular groove 84. Seal 100 is operatively arranged to be positioned in groove 84 such that it engages inverter housing 120, specifically, the radially inward facing surface of hole 126, thereby providing a seal between shroud 70 and inverter housing (see FIGS. 8A-B). Radially outward facing surface 86 is connected to radially outward facing surface 82. In some embodiments, radially outward facing surface 86 comprises a diameter that is less than the diameter of radially outward facing surface 82; thus, radially outward facing surface 86 is arranged radially inward from radially outward facing surface 82 (i.e., stepped radially inward). In some embodiments, radially outward facing surface 82 and radially outward facing surface 86 are one continuous constant diameter surface.

Surface 90 is connected to radially outward facing surface 86 and extends in axial direction AD2 from end 74 to flange 96. In some embodiments, surface 90 is a midline that divides radially outward facing surface 86 in half such that distance D3 is equal to distance D4 (see FIG. 7A). In some embodiments, distance D3 is greater than distance D4. In some embodiments, distance D3 is less than distance D4. In some embodiments, when high current terminal assembly is assembled, surface 90 is substantially aligned with surface 60. In some embodiments, when high current terminal assembly 10 is assembled, surface 90 is not aligned with surface 60. Hole 88 is arranged proximate end 74 and extends through radially outward facing surface 86. Hole 88 is operatively arranged to be aligned with hole 56 to allow engagement of bolt 34 with terminal 40. In some embodiments, and as shown, hole 88 extends to end 74. In some embodiments, and as shown, hole 88 is centered on radially outward facing surface 86 (see FIG. 7B). In some embodiments, hole 88 is not centered on radially outward facing surface 86. In some embodiments, shroud 70 does not comprise hole 88. Flange 96 is arranged parallel to end 74. In some embodiments, flange 96 is non-parallel to end 74. Flange 96, specifically surface 98 of flange 96, is operatively arranged to engage and/or abut against surface 62 of terminal 40 (see FIG. 3). Furthermore, flange 96, specifically surface 97, is operatively arranged to engage and/or abut against surface 60. The engagement of surface 97 with surface 60 provides an anti-rotation/alignment feature when assembling terminal 40 to shroud 70 (i.e., the engagement of surface 97 with surface 60 prevents terminal 40 from displacing circumferentially within shroud 70). Without flange 96, terminal 40 would be able to rotate circumferentially in shroud 70 causing alignment issues during installation. Flange 96 guarantees correct positioning and alignment of terminal 40 within shroud 70. Protrusion 92 is arranged at or proximate to end 74 and extends radially inward from radially inward facing surface 94 (see FIG. 7B). Protrusion 92 is connected to radially inward facing surface 94 and extends in radial direction RD1 (see FIGS. 7B-D). Protrusion 92 is operatively arranged to engage with groove 58 of terminal 40. In some embodiments, protrusion 92 includes a frusto-conical surface and extends radially inward in axial direction AD1 (see FIGS. 3-4). In some embodiments, radially inward facing surface 94 is frusto-conical and is arranged at angle β relative to radially outward facing surface 86 (see FIG. 7B). In some embodiments, radially inward facing surface 94 and radially outward facing surface 86 are arranged at angle β relative to radially outward facing surface 82. In some embodiments, protrusion 92 is a cylindrical surface extending radially inward (i.e., constant diameter). In some embodiments, flange 96 is at least partially separated from surface 90 by one or more slits 91. Slits 91 allow circumferential displacement of surface 90 with respect to flange 96 as terminal 40 is being assembled in shroud 70. Similarly, slits 91 allow circumferential displacement of surface 90 with respect to flange 96 as terminal 40 is being disassembled (i.e., to disengage protrusion 92 from groove 58).

Furthermore, it should be appreciated that while bolt 34 is arranged to secure busbar 20 to terminal 40, it could be used for an additional purpose. For example, in some embodiments, bolt 34 is used in combination with a nut (not shown), and when secured, the two components clamp radially outward facing surface 86 and surface 60 together, thereby preventing protrusion 92 from disengaging groove 58 (i.e., securing a nut to bolt 34 would prevent radial displacement of protrusion 92 in radial direction RD2 with respect to terminal 40). In some embodiments, hole 88 is threaded and is operatively arranged to threadably engage threading on bolt 34. Such threaded engagement between hole 88 and bolt 34 prevents radial displacement of protrusion 92 in radial direction RD2 with respect to terminal 40. In some embodiments, hole 88 is circular and is completely enclosed within shroud 70 (i.e., hole 88 does not open up to end 74).

The abutment of the extension of bolt 34 past terminal 40 (i.e., bolt 34 extends through hole 56) and engagement with shroud 70 provides additional securement, or a secondary retention means. For example, if protrusion 92 were to disengage from groove 58, the engagement of bolt 34 with shroud 70, via hole 88, prevents displacement of terminal 40 in axial direction AD1 with respect to shroud 70. Thus, both the engagement of protrusion 92 with groove 58 and the engagement of bolt 34 with hole 88 prevents displacement of terminal 40 in axial direction AD1 with respect to shroud 70.

To assemble high current terminal assembly 10, end 44 of terminal 40 is inserted in hole 76 of shroud 70 in axial direction AD1 until protrusion 92 engages groove 58 (see FIG. 3). As terminal 40 is displaced in axial direction AD1 within shroud 70, radially outward facing surface 64 will engage protrusion 92 forcing end 74 radially outward until protrusion 92 aligns with groove 58, at which point protrusion 92 will snap radially inward and engage groove 58. Once engaged with groove 58, protrusion 92 prevents terminal 40 from displacing in axial direction AD2 with respect to shroud 70 (see FIGS. 3-4). Also, surface 62 of terminal 40 is engaged with, abutting against, or arranged proximate to surface 98 of flange 96 of shroud 70. The engagement of surface 62 and flange 96 prevents terminal 40 from displacing in axial direction AD1 with respect to shroud 70 (see FIG. 3). As such, the specific design of terminal 40 and shroud 70 allow the two components to easily lock or snap together with very easy assembly.

Figure 8A:
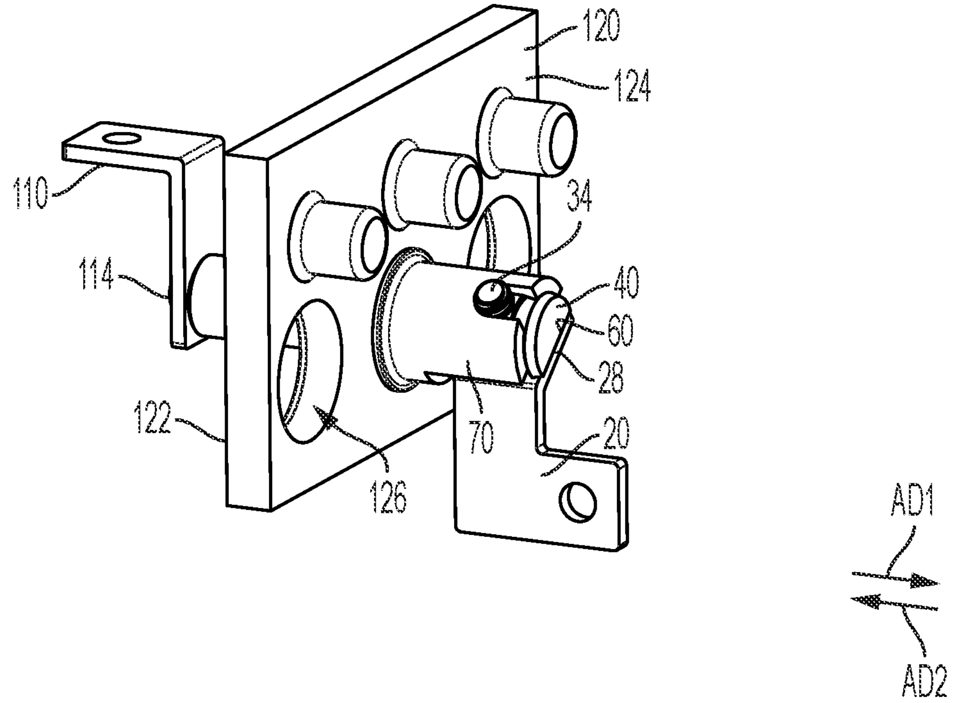
FIG. 8A is a rear partial perspective view of the high current terminal assembly installed in an inverter housing; and, FIG. 8B is a front partial perspective view of the high current terminal assembly installed in the inverter housing shown in in FIG. 8A.
Figure 8B:
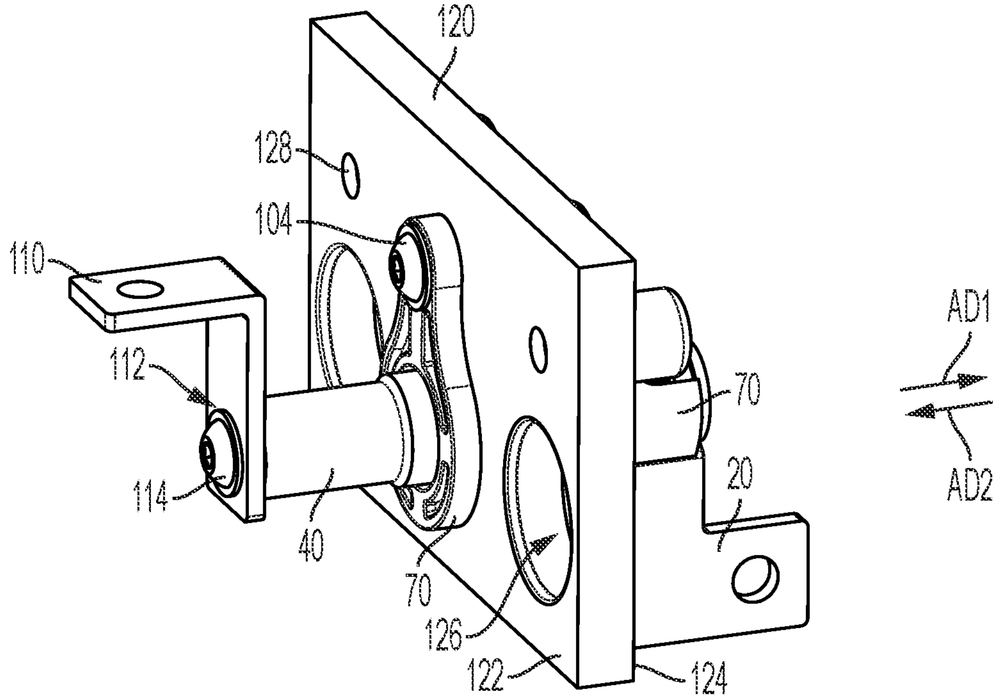

FIG. 8A is a rear partial perspective view of high current terminal assembly 10 installed in inverter housing 120. FIG. 8B is a front partial perspective view of high current terminal assembly 10 installed in inverter housing 120. It should be appreciated that, for viewing purposes, only a partial view of inverter housing 120 is shown. Inverter housing 120 generally comprises inner surface 122, outer surface 124, one or more holes 126, and one or more holes 128. Holes 126 extend from inner surface 122 to outer surface 124 and are arranged to engage high current terminal assembly 10. Specifically, end 44 of terminal and end 74 are inserted through hole 126 in axial direction AD1 from the interior of inverter housing 120 until surface 73 of shroud 70 engages inner surface 122. Bolt 104 is then inserted through hole 80 and engages hole 128 to fixedly secure shroud 70, and thus terminal 40, to inverter housing 120. Once fixedly secured, and as shown, surface 60 is exposed on the exterior of inverter housing 120 allowing connection of a busbar, for example busbar 20. Additionally, busbar 110 can be connected to end 42 of terminal 40 via bolt 114, as previously described. Shroud 70 is specifically arranged to cover as much of terminal 40 as possible while still allowing electrical connection. As previously mentioned, the present disclosure aims to prevent possible damage to terminal 40 (e.g., scratches, gouges, dents, etc.) which could result in catastrophic failure due to high current running therethrough. Thus, by covering the top portion of terminal 40 that is arranged outside of inverter housing 120, there is a much less likelihood of damaging terminal 40 during manufacturing, for example, of an electric vehicle (i.e., shroud 70 would protect the exposed portion of terminal 40 during installation of other components in the electric vehicle). Furthermore, seal 66 arranged between terminal 40 and shroud 70, and seal 100 arranged between shroud 70 and hole 126 of inverter housing, prevents water or other fluid from entering or exiting inverter housing 120.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

10 High current terminal assembly
20 Busbar
22 Section
24 Hole
26 Section
28 Surface
30 Hole
34 Bolt (or fastener)
40 Terminal
42 End
43 Hole
44 End
46 Radially outward facing surface
48 Radially outward facing surface
50 Groove
52 Radially outward facing surface
54 Radially outward facing surface
56 Hole
58 Groove
60 Surface
62 Surface
64 Radially outward facing surface
66 Seal
70 Shroud (or cover)
72 End
73 Surface
74 End
76 Hole
78 Flange
79 Portion
80 Hole
82 Radially outward facing surface
84 Groove
86 Radially outward facing surface
88 Hole
90 Surface
91 Slits
92 Protrusion
94 Radially inward facing surface
96 Flange
97 Surface
98 Surface
100 Seal
102 Bushing (or compression limiter)
104 Bolt
110 Busbar
112 Hole
114 Bolt
120 Inverter housing
122 Inner surface
124 Outer surface
126 Holes
128 Holes
α Angle
β Angle
AD1 Axial direction
AD2 Axial direction
RD1 Radial direction
RD2 Radial direction
D1 Distance
D2 Distance
D3 Distance
D4 Distance

What is claimed is:

1. A high current terminal assembly, comprising:
a terminal including:
a first end;
a second end;
a radially outward facing surface; and
a radial surface that traverses the radially outward facing surface; and
a shroud at least partially surrounding the terminal, the shroud including:
a third end arranged proximate to the first end;
a fourth end forming a first flange;
a first hole forming a radially inward facing surface, wherein the terminal is arranged in the first hole and the radially inward facing surface is operatively arranged to engage the radially outward facing surface; and
a second flange extending radially inward in a first radial direction from the radially inward facing surface, the second flange operatively arranged to engage the radial surface.

2. The high current terminal assembly as recited in claim 1, wherein:
the radially outward facing surface comprises a first groove proximate the first end;
the radially inward facing surface comprises a protrusion proximate the third end and extending radially inward in the first radial direction therefrom; and the protrusion is operatively arranged to engage the first groove to connect the shroud to the terminal.

3. The high current terminal assembly as recited in claim 2, wherein the engagement of the protrusion with the first groove prevents axial displacement of the shroud with respect to the terminal in an axial direction.

4. The high current terminal assembly as recited in claim 2, wherein the protrusion forms a frusto-conical surface extending in the first radial direction in the axial direction.

5. The high current terminal assembly as recited in claim 1, wherein:

the radially outward facing surface further comprises a groove; and, a first seal is arranged in the groove and operatively arranged to engage the radially inward facing surface to fluidly seal the terminal and the shroud.

6. The high current terminal assembly as recited in claim 1, wherein the first flange comprises a second hole.

7. The high current terminal assembly as recited in claim 6, further comprising a bushing arranged in the second hole, wherein:

the bushing comprises a first material having a first hardness;

the shroud comprises a second material having a second hardness; and the first hardness is greater than the second hardness.

8. The high current terminal assembly as recited in claim 2, wherein the terminal further comprises an axial surface, the axial surface operatively arranged to engage the second flange to prevent displacement of the shroud with respect to the terminal in an axial direction.

9. The high current terminal assembly as recited in claim 1, wherein:

the radially outward facing surface further comprises a groove; and a seal is arranged in the groove and operatively arranged to engage a hole of an inverter housing to fluidly seal the shroud and the inverter housing.

10. The high current terminal assembly as recited in claim 1, wherein the terminal further comprises:

a second hole arranged proximate the first end; and a third hole arranged proximate the second end.

11. A high current terminal assembly, comprising:

a shroud, comprising:

a first end;

a second end forming a first flange;

a first hole extending at least partially from the first end to the second end, the first hole forming a radially inward facing surface; and a second flange arranged between the first end and the second end, the second flange extending radially inward in a first radial direction from the radially inward facing surface;

a portion extending radially from the first flange, the portion including a second hole arranged parallel to the first hole.

12. The high current terminal assembly as recited in claim 11, wherein the shroud further comprises a protrusion arranged proximate the first end, the protrusion extending from the radially inward facing surface in the first radial direction.

13. The high current terminal assembly as recited in claim 11, wherein the radially inward facing surface forms a partial circle ending at a first axial surface.

14. The high current terminal assembly as recited in claim 12, further comprising a terminal operatively arranged to engage the first hole, the terminal comprising:

a third end having a groove, the groove operatively arranged to engage the protrusion to prevent displacement of the terminal with respect to the shroud in a first axial direction;

a fourth end;

a radially outward facing surface operatively arranged at least proximate to the radially inward facing surface; and a second axial surface operatively arranged to engage second flange to prevent displacement of the terminal with respect to the shroud in a second axial direction, opposite the first axial direction.

15. The high current terminal assembly as recited in claim 11, further comprising a bushing arranged in the second hole, wherein:

the bushing comprises a first material having a first hardness;

the shroud comprises a second material having a second hardness; and the first hardness is greater than the second hardness.

16. A high current terminal assembly, comprising:

a terminal, comprising:

a first end including a groove;

a second end;

a radially outward facing surface;

a planar radial surface that traverses the radially outward facing surface, the planar radial surface extending from the first end towards the second end; and an axial surface arranged between the first end and the second end, the axial surface connected and being arranged perpendicular to the radial surface.

17. The high current terminal assembly as recited in claim 16, wherein the terminal further comprises:

a second hole arranged proximate the first end, the second hole extending in a radial direction through the planar radial surface; and a third hole extending axially from the second end.

18. The high current terminal assembly as recited in claim 16, further comprising a shroud operatively arranged to at least partially surround the terminal, the shroud comprising:

a third end;

a fourth end forming a first flange;

a first hole forming a radially inward facing surface, the terminal arranged in the first hole;

a second flange arranged between the first end and the second end, the second flange extending radially inward from the radially inward facing surface and operatively arranged to engage the axial surface to prevent displacement of the terminal with respect to the shroud in a first axial direction; and a protrusion extending radially inward from the radially inward facing surface and operatively arranged to engage the groove to prevent displacement of the terminal with respect to the shroud in a second axial direction, opposite the first axial direction.

* * * * *